United States Patent
Gekht et al.

(10) Patent No.: US 9,598,974 B2
(45) Date of Patent: Mar. 21, 2017

(54) ACTIVE TURBINE OR COMPRESSOR TIP CLEARANCE CONTROL

(71) Applicant: PRATT & WHITNEY CANADA CORP., Longueuil (CA)

(72) Inventors: Eugene Gekht, Brossard (CA); Terrence Lucas, Candiac (CA); Thomas Francis Haslam-Jones, Brossard (CA); Danny Mills, Chateauguay (CA); Guy Bouchard, Mont St. Hilaire (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 1174 days.

(21) Appl. No.: 13/775,806

(22) Filed: Feb. 25, 2013

(65) Prior Publication Data

US 2014/0241854 A1  Aug. 28, 2014

(51) Int. Cl.
*F01D 11/24* (2006.01)
*F01D 25/12* (2006.01)

(52) U.S. Cl.
CPC ............. *F01D 11/24* (2013.01); *F01D 25/12* (2013.01); *F05D 2220/321* (2013.01); *F05D 2240/11* (2013.01); *F05D 2250/241* (2013.01); *F05D 2250/711* (2013.01); *F05D 2260/201* (2013.01); *Y02T 50/676* (2013.01)

(58) Field of Classification Search
CPC ........... F01D 11/20; F01D 11/22; F01D 11/24
USPC ................................................... 60/782, 806
See application file for complete search history.

(56) References Cited

U.S. PATENT DOCUMENTS

| 4,329,114 | A | | 5/1982 | Johnston et al. |
|---|---|---|---|---|
| 4,330,234 | A | | 5/1982 | Colley |
| 4,596,116 | A | | 6/1986 | Mandet et al. |
| 4,683,716 | A | | 8/1987 | Wright et al. |
| 4,844,688 | A | | 7/1989 | Clough et al. |
| 4,893,984 | A | | 1/1990 | Davison et al. |
| 5,048,288 | A | | 9/1991 | Bessette et al. |
| 5,056,988 | A | | 10/1991 | Corsmeier et al. |
| 5,116,199 | A | * | 5/1992 | Ciokajlo ............. F01D 11/24 415/116 |
| 5,211,534 | A | | 5/1993 | Catlow |
| 5,212,940 | A | | 5/1993 | Glover |
| 5,261,228 | A | | 11/1993 | Shuba |
| 5,351,473 | A | | 10/1994 | Shuba |
| 5,456,576 | A | | 10/1995 | Lyon |
| 5,593,277 | A | | 1/1997 | Proctor et al. |
| 5,601,402 | A | | 2/1997 | Wakeman et al. |
| 5,980,201 | A | * | 11/1999 | Benoist ............... F01D 25/14 415/115 |

(Continued)

*Primary Examiner* — William H Rodriguez
*Assistant Examiner* — Charles Nichols
(74) *Attorney, Agent, or Firm* — Norton Rose Fulbright Canada

(57) ABSTRACT

A gas turbine engine includes an annular plenum defined with an outer skin and a perforated inner skin for receiving selective air flow to impinge a support case which supports shrouds of the rotor assemblies of the engine therein for active tip clearance control of the rotor assemblies. In one embodiment a bobbin-type transfer tube for supplying cooling air into the plenum, is provided between an outer case of the engine an the plenum such that the thermally induced relative movement of the outer case and the plenum is permitted.

15 Claims, 3 Drawing Sheets

(56) References Cited

U.S. PATENT DOCUMENTS

| | | | |
|---|---|---|---|
| 5,993,150 A * | 11/1999 | Liotta | F01D 11/10 |
| | | | 415/115 |
| 6,152,685 A | 11/2000 | Hagi | |
| 6,851,255 B2 | 2/2005 | Aitchison et al. | |
| 6,925,814 B2 | 8/2005 | Wilson et al. | |
| 6,978,622 B2 | 12/2005 | Dittmann et al. | |
| 7,140,836 B2 | 11/2006 | Balsdon | |
| 7,165,937 B2 | 1/2007 | Dong et al. | |
| 7,596,954 B2 | 10/2009 | Penda et al. | |
| 7,686,569 B2 | 3/2010 | Paprotna et al. | |
| 7,708,518 B2 | 5/2010 | Chehab | |
| 8,221,061 B2 * | 7/2012 | Massot | F01D 5/145 |
| | | | 415/145 |
| 2013/0149123 A1 * | 6/2013 | Laurello | F01D 11/24 |
| | | | 415/191 |

* cited by examiner

ACTIVE TURBINE OR COMPRESSOR TIP CLEARANCE CONTROL

TECHNICAL FIELD

The described subject matter relates generally to gas turbine engines, and more particularly, to an improved active turbine or compressor tip clearance control system of a gas turbine engine.

BACKGROUND OF THE ART

In gas turbine engines tip clearance between the compressor or turbines and the surrounding duct is kept as small as possible, to force as much air as possible in the gas path through the blades in order to maximize engine efficiency. Tip clearance is ideally optimized for an engine's hot running conditions, however, this can create "pinch" points, in which the difference in thermal expansion between the blades and the surrounding duct causes the blades to bind on the duct walls. Historically, tip clearance has been sized to prevent the occurrence of pinch points, however this is not optimal for hot (normal) running conditions. A well-known solution is so-called "active tip clearance control" in which cooling air is used to shrink the duct size during hot running conditions in order to minimize tip clearance during normal running conditions. The cooling air is turned off, for example during start-up and other flight stages in order to allow the duct size to expand enough to prevent pinch points. Numerous configurations of active tip clearance control systems are known. Conventionally, either the turbine support case which supports the turbine static shrouds, and/or the turbine static shrouds themselves are cooled. One perennial issue with active tip clearance control systems is where to take the cooling air from, and how to provide it to the area to be cooled.

Accordingly, there is a need to provide an improved active tip clearance control system for gas turbine engines.

SUMMARY

In one aspect, there is provided a gas turbine engine comprising a rotor encircled by an annular shroud supported within an annular support case, an annular plenum being provided within an annular outer case of the engine and defined radially between an outer skin and a perforated inner skin of the annular plenum, the annular plenum being placed around and supported on the annular support case, a first transfer tube having a radial inner end sealingly received in a first port in the outer skin and a radial outer end sealingly received in a second port in the outer case, the second port in the outer case being in fluid communication with a source of pressurized cooling air to allow a first flow of pressurized cooling air to pass through the first transfer tube and then enter the plenum in order to pass through the perforated inner skin for impingement cooling of the support case, wherein the respective radial inner and outer ends of the first transfer tube each comprise a portion of a spherical surface in contact with a cylindrical inner surface of the respective first and second ports to allow thermally induced axial, radial and circumferential relative movement of the outer case and the plenum.

In another aspect, there is provided a gas turbine engine comprising a first turbine stage assembly, a second turbine stage assembly and a stator vane ring assembly disposed axially between the first and second turbine stage assemblies, the first turbine stage assembly including a first turbine rotor encircled by an annular first turbine shroud, the second turbine stage assembly including a second turbine rotor encircled by an annular second turbine shroud, the stator vane ring assembly defining a hot gas path between the first and second turbine stage assemblies, an annular support case positioned around and supporting the first turbine stage assembly, the stator vane ring assembly and the second turbine stage assembly, a perforated impingement skin being positioned within the annular support case, adjacent and radially spaced apart from a radial outer surface of the respective first, second pressure turbine shrouds and stator vane ring assembly, an annular plenum defined radially between an outer skin and a perforated inner skin of the annular plenum, the annular plenum being provided within an annular outer case of the engine and surrounding and being supported on the annular support case, a first transfer tube radially extending through an annular cavity surrounding the annular plenum and defined in the outer case, the first transfer tube being connected at a radial inner end to the outer skin and being in communication with the annular plenum, the first transfer tube being connected at a radial outer end to the annular outer case and being connected to a source of pressurized cooling air through a control valve to thereby form an active tip clearance control system to selectively conduct a first flow of pressurized cooling air from the first source to enter the annular plenum and to pass through the perforated inner skin in order to impinge on the support case, a plurality of second transfer tubes extending radially through the annular plenum to form at least part of air passages isolated from the annular plenum, said air passages being in fluid communication with the annular cavity and a space in the annular support case in order to introduce a second flow of pressurized cooling air from the annular cavity into the annular support case and to then pass through the respective perforated impingement skins to continuously cool the first and second turbine shrouds and the stator vane ring assembly during engine operation, wherein the respective radial inner and outer ends of the first transfer tube each comprise a portion of a spherical surface in contact with a cylindrical inner surface of the respective first and second ports to allow thermally induced axial, radial and circumferential relative movement of the outer case and the plenum.

Further details of these and other aspects of the described subject matter will be apparent from the detailed description and drawings included below.

DESCRIPTION OF THE DRAWINGS

Reference is now made to the accompanying figures in which.

It should be noted that throughout the appended drawings, like features are identified by like reference numerals.

DETAILED DESCRIPTION

Figure 1:
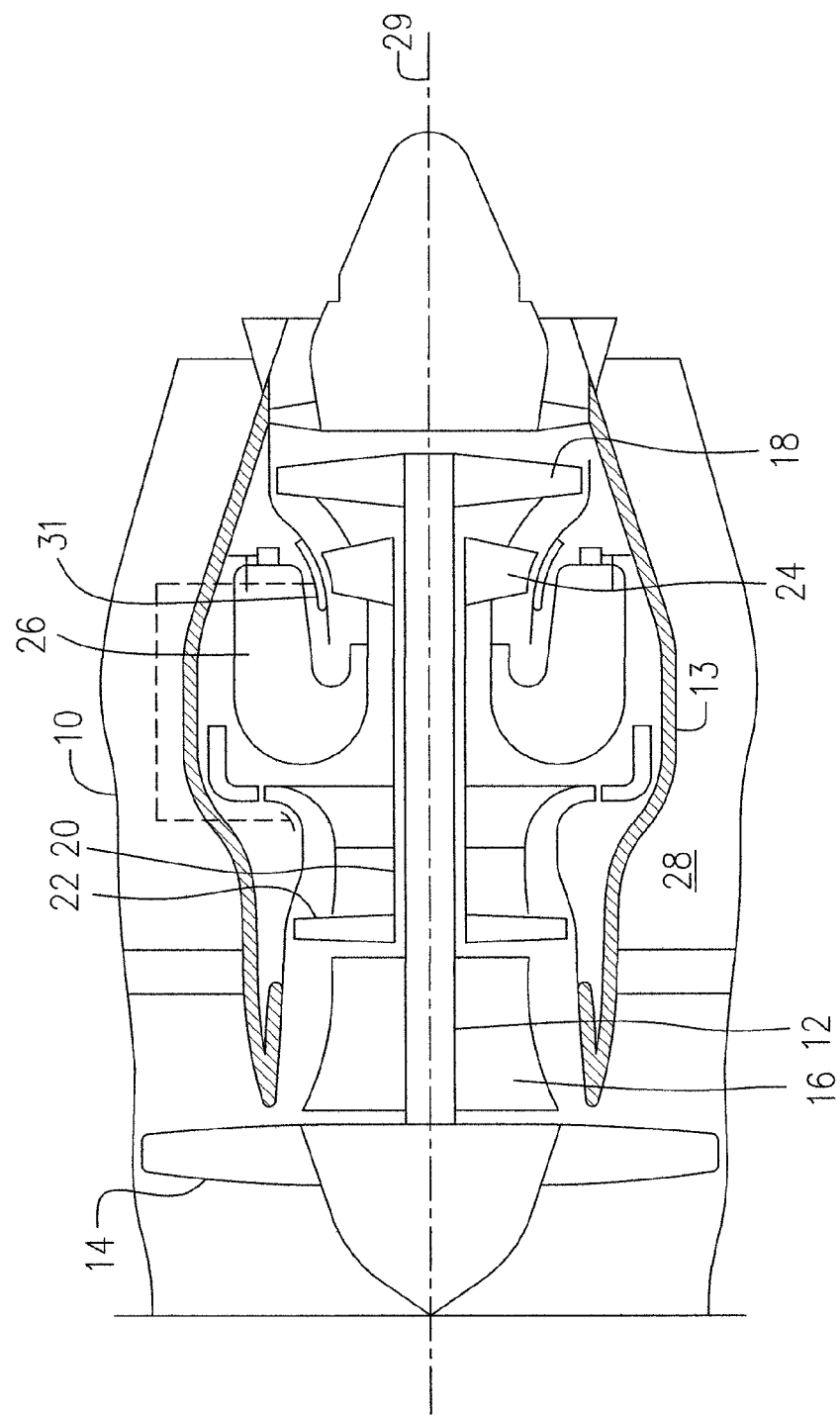
FIG. 1 is a schematic side cross-sectional view of a turbofan gas turbine engine as an exemplary application of an active tip clearance control system according to one embodiment.

FIG. 1 illustrates an aircraft turbofan gas turbine engine presented as an example of the application of the described subject matter, including a housing or nacelle 10, an annular core casing or engine outer case 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The annular outer case 13 surrounds the low and high pressure spool assemblies 12 and 20 in order to define a main fluid path (not numbered) therethrough. A combustor 26 is provided in the main fluid path. An annular bypass air duct 28 is defined radially between the annular nacelle 10 and the annular outer case 13 for directing a main bypass air stream therethrough. The high pressure turbine assembly 24 may include multiple turbine stages which are not shown in FIG. 1, but will be further described with reference to FIGS. 2 and 3.

It should be noted that the terms "radial", "axial" and "circumferential" throughout this description and appended claims, are referenced to a central axis 29 of the gas turbine engine.

Figure 2:
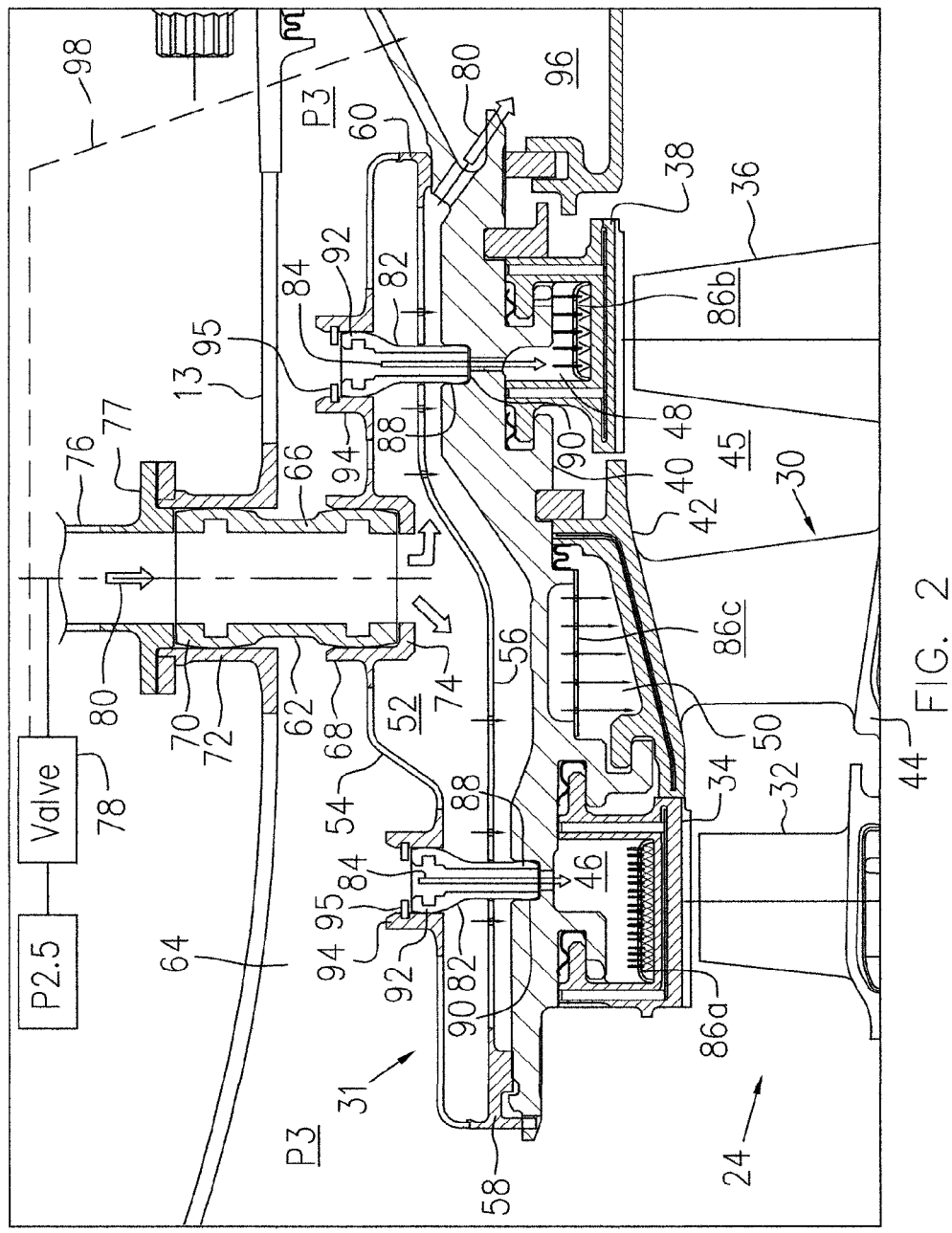
FIG. 2 is a partial cross-sectional view of the gas turbine engine of FIG. 1, showing an embodiment of the active tip clearance control system located in a turbine section of the engine above the engine central axis.
Figure 3:
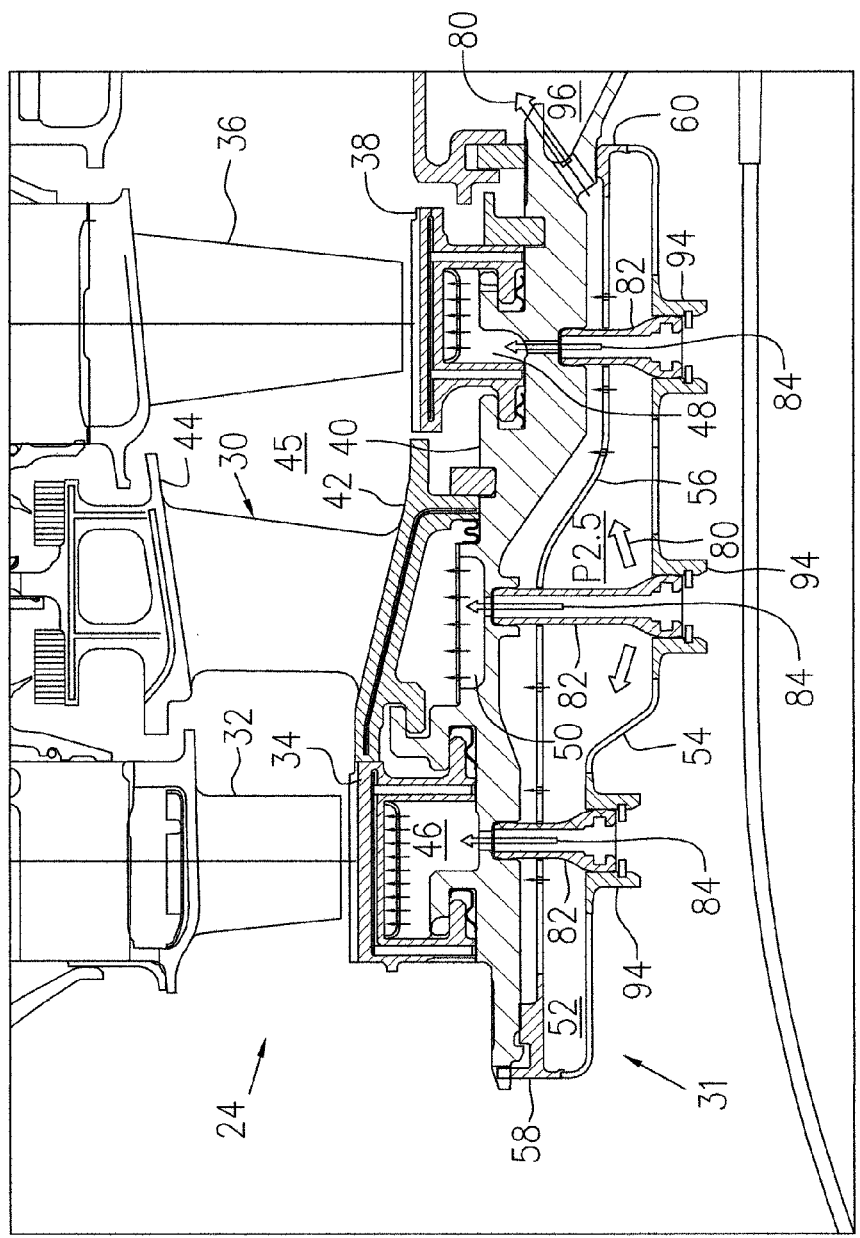
FIG. 3 is a partial cross-sectional view of the engine in FIG. 1, showing an embodiment of the active tip clearance control system located in a turbine section of the engine below the engine central axis.

As illustrated in FIGS. 1-3, the high pressure turbine assembly 24 includes a first high pressure turbine stage rotor 32 with a plurality of radially extending blades (not numbered) encircled by an annular first high pressure turbine shroud 34. The high pressure turbine assembly 24 further includes a second high pressure turbine stage rotor 36 with a plurality of radially extending blades (not numbered) disposed downstream of the first high pressure turbine stage rotor 32 and encircled by an annular second high pressure turbine shroud 38. The first and second high pressure turbine shrouds 34, 38 may be provided in a circumferentially segmented configuration and are supported within an annular support case 40 which is placed around the first and second high pressure turbine shrouds 34, 38 and the stator vane ring assembly 30, and is supported in a stationary structure of the engine.

The stator vane ring assembly 30 may include a plurality of circumferentially spaced vanes (not numbered) radially extending between and interconnecting an outer ring 42 and an inner ring 44 to form an annular gas path 45 positioned axially between the first and second high pressure turbine stage rotors 32, 36 for conducting hot gases discharged from the first high pressure turbine stage rotor 32, into and through the second high pressure turbine stage rotor 36. The stator vane ring assembly 30 is also placed within and supported by the annular support case 40. The stator vane ring assembly 30 may also be provided in a circumferentially segmented configuration.

Each of the first and second high pressure turbine shrouds 34, 38 and outer ring 42 of the stator vane ring assembly 30 may include two radially outwardly extending annular legs (not numbered) connected to the annular support case 40, thereby forming individual annular cavities 46, 48 and 50 radially between the annular support case 40 and each of the first and second high pressure turbine shrouds 34, 38 and outer ring 42 of the stator vane ring assembly 30.

An active tip clearance control system 31 provided in the engine according to one embodiment, for example located in a turbine section, may include an annular plenum 52 defined radially between an outer skin 54 and a perforated inner skin 56. The annular plenum 52 is located within the annular outer case 13 of the engine. The plenum 52 is placed around and supported on the annular support case 40, for example by respective support lands 58, 60 located at front and rear ends of the annular plenum 52.

A transfer tube 62 (only shown in FIG. 2) is provided to radially extend between the annular outer case 13 and the annular outer skin 54 of the plenum 52, across an annular cavity 64 defined within the annular outer case 13 and surrounding the outer skin 54 of the plenum 52. The transfer tube 62 may have a radial inner end 66 sealingly received in a first port 68 defined in the outer skin 54 of the plenum 52 and a radial outer end 70 sealingly received in a second port 72 defined in the outer case 13. The transfer tube 62 may be of a bobbin type and thus the respective radial inner and outer ends 66, 70 of the transfer tube 62 each may include a portion of a spherical surface (not numbered) in contact with a cylindrical inner surface (not numbered) of the respective first and second ports 68, 72, according to one embodiment. This allows thermally introduced axial, radial and circumferential relative movement of the outer case 13 and the plenum 52.

According to one embodiment, the cylindrical inner surface of the first port 68 may extend radially inwardly to terminate at an annular shoulder 74 which extends inwardly from the cylindrical inner surface in order to support the radial inner end 66 of the transfer tube 62 and to define an opening (not numbered) of the first port 68 in fluid communication with the first transfer tube 62 and the annular plenum 52. A cylindrical inner surface of the second port 72 may extend radially through a body of the second port 72 to allow the transfer tube 62 to be inserted radially and inwardly through the second port 72 until the radial inner end 66 of the transfer tube 62 rests on the annular shoulder 74 of the first port 68 during an engine assembly procedure.

According to one embodiment, the second port 72 in the outer case 13 may be in fluid communication with a source of pressurized cooling air such as compressor bleed air P2.5, for example through a pipeline 76 and a valve 78 to allow a first flow (indicated by arrows 80) of pressurized cooling air to pass through the transfer tube 62 and then enter the plenum 52 in order to pass through the perforated inner skin 56 for impingement cooling of the support case 40.

A connecting flange 77 attached to the pipeline 76 may be provided to connect the pipeline 76 to the second port 72 to thereby prevent the transfer tube 62 from being withdrawn from the second port 52.

If the valve 78 is optionally included in the pipeline 76, the first flow 80 of pressurized cooling air may be controlled for selectively cooling the support case 40, thereby forming the active tip clearance control system 31.

According to one embodiment, a plurality of transfer tubes 82 (or at least one transfer tube 82) may be provided to extend radially through the annular plenum 52 to form at least a part of an air passage (not numbered) isolated from the plenum 52 and connecting the annular cavity 64 with a space within the annular support case 40, for continuously introducing a second flow (indicated by arrow 84) of pressurized cooling air, such as fully pressurized compressor air P3 contained in the annular cavity 64, into the inside of the annular support case 40 to cool for example, the respective first and second high pressure turbine shrouds 34, 38 and the outer ring 42 of the stator vane ring assembly 30.

Annular or circumferentially segmented perforated impingement skins 86a, 86b and 86c may be positioned within the annular support case 40, adjacent and radially spaced apart from a radial outer surface (not numbered) of the respective first and second high pressure turbine shrouds 34, 38 and outer ring 42 of the stator vane ring assembly 30. The plurality of transfer tubes 82 may include at least three such tubes, aligning with the first and second high pressure turbine shrouds 34, 38 and the outer ring 42 of the stator vane ring 30 assembly respectively, such that the second air flow 84 entering the inside of the annular support case 40 may be distributed into the respective annular cavities 46, 48 and 50 and may pass through the perforated impingement skins 86a, 86b and 86c to create impingement cooling on the respective first and second high pressure turbine shrouds 34, 38 and outer ring 42 of the stator vane ring assembly 30. Optionally, two or more transfer tubes 82 may be provided to supply the second flow of pressurized cooling air to one of the cavities 46, 48 and 50 for even distribution of the pressurized cooling air within each of the annular cavities 46, 48 and 50.

The transfer tubes 82 which may also be of a bobbin type, may extend through respective openings (not numbered) in the perforated inner skin 56 of the plenum 52 and each transfer tube 82 comprises a radial inner end 88 sealingly received in a third port 90 in the annular support case 40 and a radial outer end 92 sealingly received in a fourth port 94 in the outer skin 54 of the plenum 52. The respective radial inner and outer ends 88, 92 of each transfer tube 82 may have a portion of a spherical surface (not numbered) in contact with a cylindrical inner surface (not numbered) of the respective third and fourth ports 90, 94 to allow thermally induced axial, radial and circumferential relative movement of the plenum 52 and the support case 40.

According to one embodiment, the third port 90 may be formed as a counterbore defined in the annular support case 30. An enlarged portion of the counterbore may define the cylindrical inner surface of the third port 90 in contact with the portion of the spherical surface of the radial inner end 88 of the transfer tube 82. The cylindrical inner surface of each of the fourth ports 94 may extend radially through a body of the fourth port 94 to allow the transfer tube 82 to be inserted radially and inwardly through the fourth port 94 until the radial inner end 88 of the transfer tube 82 rests in the counterbore of the third port 90. The counterbore of each third port 90 may radially extend through the wall of the annular support case 40 to be in fluid communication with one of the transfer tubes 82 and one of the annular cavities 46, 48 and 50.

A split retaining ring 95 received in an annular inner groove (not numbered) in each fourth port 94 may be provided to prevent one of the transfer tubes 82 from being withdrawn from the fourth port 94.

It should be noted that the second flow of pressurized cooling air 84 comes from compressor air P3 (which is higher in both pressure and temperature than P2.5 air) is used for continuously cooling the first and second high pressure turbine shrouds 34, 38 and the stator vane ring assembly 30, while the first flow of pressurized cooling air 80 comes from compressor air P2.5 (which is lower in both pressure and temperature than P3 air) is used for selectively cooling the annular support case 40 and thus the first and second high pressure turbine shrouds 34, 38 during engine hot running conditions, in order to minimize tip clearance during normal running conditions. After cooling the annular support case 40, the exhausted first flow of pressurized cooling air 80 is discharged into an outer plenum 96 of the low pressure turbine assembly 18 (which is not indicated in FIGS. 2 and 3) for further cooling the low pressure turbine assembly 18. The first flow of pressurized cooling air 80 (P2.5) is turned off during start-up and other flight stages to allow the annular support case 40 and low and high pressure turbine shrouds 34, 38 to expand in order to prevent pinch points.

Optionally, the control valve 78 may be provided in a type of three-way valve, which is also connected to the outer plenum 96 of the low pressure turbine assembly, as indicated by broken line 98 in FIG. 2, such that the first flow of pressurized cooling air 80 can be modulated to flow either to the active tip clearance system 31 or directly to the outer plenum 96 of the low pressure turbine assembly.

The plenum 52 may be fabricated with sheet metal outer and inner skins 54, 56 and with machined parts of lands 60.

The bobbin-type transfer tubes 62, 82 according to this embodiment having spherical surfaces at both ends 66, 70, 33, 92 which serve as seals to the cylindrical receptacles, will cater to any reasonable misalignment when the bobbin-type transfer tubes 62, 82 are inserted into the ports 68, 72, 90, 94. Therefore, the active clearance control system 31 according to this embodiment, does not require multiple metal seals such as "C", "W", "E" and "bellow" type seals, thereby significantly reducing the number of parts.

It should also be noted that the embodiments as above-described may also be applicable to compressor rotors and/or turbine rotors in gas turbine engines, and to single and/or multiple stage rotor assemblies.

The above description is meant to be exemplary only, and one skilled in the art will recognize that changes may be made to the embodiments described without departing from the scope of the described subject matter. For example, although a turbofan gas turbine engine which includes high and low pressure spools is used in the described embodiments to illustrate the application of the described subject matter, other types of gas turbine engines may also be applicable. The described active tip clearance system may also be applicable in a gas turbine engine having high intermediate and low pressure spools. In such an embodiment, instead of presenting the first and second high pressure turbine stage rotors, the components 32 and 36 shown in the drawings would represent high and intermediate pressure turbine rotors of the respective high and intermediate pressure spools. Modifications which fall within the scope of the described subject matter will be apparent to those skilled in the art, in light of a review of this disclosure, and such modifications are intended to fall within the appended claims.

The invention claimed is:

1. A gas turbine engine comprising a rotor encircled by an annular shroud supported within an annular support case, an annular plenum provided within an annular outer case of the engine and defined radially between an outer skin and a perforated inner skin of the annular plenum, an annular cavity surrounding the outer skin of the annular plenum and defined within the outer case, the annular plenum being placed around and supported on the annular support case, a first transfer tube extending radially through and fluidly isolated from the annular cavity having a radial inner end sealingly received in a first port in the outer skin and a radial outer end sealingly received in a second port in the outer case, the second port in the outer case being in fluid communication with a source of pressurized cooling air to allow a first flow of pressurized cooling air to pass through the first transfer tube and then enter the plenum in order to pass through the perforated inner skin for impingement cooling of the support case, wherein the respective radial inner and outer ends of the first transfer tube each comprise a portion of a spherical surface in contact with a cylindrical inner surface of the respective first and second ports to allow thermally induced axial, radial and circumferential relative movement of the outer case and the plenum, a second transfer tube extending radially through the annular plenum to form at least a part of an air passage isolated from the plenum, the air passage communicating with said annular cavity surrounding the outer skin of the annular plenum, and with a space defined within the annular support case for continuously introducing a second flow of pressurized cooling air from said cavity into the annular support case to cool the annular shroud.

2. The gas turbine engine as defined in claim 1 wherein the second port in the outer case is connected through a control valve to the source of the pressurized cooling air for selectively cooling the support case.

3. The gas turbine engine as defined in claim 1 wherein the first flow of pressurized cooling air from the first source is cooler than the second flow of pressurized cooling air contained in the annular cavity.

4. The gas turbine engine as defined in claim 1 wherein the second transfer tube extends through the inner skin and comprises a radial inner end sealingly received in a third port in the annular support case and a radial outer end sealingly received in a fourth port in the outer skin, wherein the respective radial inner and outer ends of the second transfer tube each comprise a portion of a spherical surface in contact with a cylindrical inner surface of the respective third and fourth ports to allow thermally induced axial, radial and circumferential relative movement of the plenum and the support case.

5. The gas turbine engine as defined in claim 1 wherein the cylindrical inner surface of the first port extends radially inwardly and terminates at an annular shoulder of the first port, the annular shoulder extending inwardly from the cylindrical inner surface to support the radially inner end of the first transfer tube and to define an opening of the first port in fluid communication with the first transfer tube and the annular plenum.

6. The gas turbine engine as defined in claim 5 wherein the cylindrical inner surface of the second port extends radially through a body of the second port to allow the first transfer tube to be inserted radially and inwardly through the second port until the radial inner end of the first transfer tube rests on the annular shoulder of the first port.

7. The gas turbine engine as defined in claim 4 wherein the third port is formed as a counterbore defined in the annular support case, an enlarged portion of the counterbore defining the cylindrical inner surface of the third port in contact with the portion of the spherical surface of the radial inner end of the second transfer tube.

8. The gas turbine engine as defined in claim 7 wherein the cylindrical inner surface of the fourth port extends radially through a body of the fourth port to allow the second transfer tube to be inserted radially and inwardly through the fourth port until the radial inner end of the second transfer tube rests in the counterbore of the third port.

9. A gas turbine engine comprising a first turbine stage assembly, a second turbine stage assembly and a stator vane ring assembly disposed axially between the first and second turbine stage assemblies, the first turbine stage assembly including a first turbine rotor encircled by an annular first turbine shroud, the second turbine stage assembly including a second turbine rotor encircled by an annular second turbine shroud, the stator vane ring assembly defining a hot gas path between the first and second turbine stage assemblies, an annular support case positioned around and supporting the first turbine stage assembly, the stator vane ring assembly and the second turbine stage assembly, a perforated impingement skin being positioned within the annular support case, adjacent and radially spaced apart from a radial outer surface of the respective first, second pressure turbine shrouds and stator vane ring assembly, an annular plenum defined radially between an outer skin and a perforated inner skin of the annular plenum, the annular plenum being provided within an annular outer case of the engine and surrounding and being supported on the annular support case, a first transfer tube radially extending through and being fluidly isolated from an annular cavity surrounding the annular plenum and defined in the outer case, the first transfer tube being connected at a radial inner end to the outer skin and being in communication with the annular plenum, the first transfer tube being connected at a radial outer end to the annular outer case and being connected to a source of pressurized cooling air through a control valve to thereby form an active tip clearance control system to selectively conduct a first flow of pressurized cooling air from the first source to enter the annular plenum and to pass through the perforated inner skin in order to impinge on the support case, a plurality of second transfer tubes extending radially through the annular plenum to form at least part of air passages isolated from the annular plenum, said air passages being in fluid communication with the annular cavity and a space in the annular support case in order to introduce a second flow of pressurized cooling air from the annular cavity into the annular support case and to then pass through the respective perforated impingement skins to continuously cool the first and second turbine shrouds and the stator vane ring assembly during engine operation, wherein the respective radial inner and outer ends of the first transfer tube each comprise a portion of a spherical surface in contact with a cylindrical inner surface of the respective first and second ports to allow thermally induced axial, radial and circumferential relative movement of the outer case and the plenum.

10. The gas turbine engine as defined in claim 9 wherein each of the second transfer tubes extends through the inner skin and comprises a radial inner end sealingly received in one of a plurality of third ports in the annular support case and a radial outer end sealingly received in one of a plurality of fourth ports in the outer skin.

11. The gas turbine engine as defined in claim 10 wherein the respective radial inner and outer ends of the second transfer tubes each comprise a portion of a spherical surface in contact with a cylindrical inner surface of the respective third and fourth ports to allow thermally induced axial, radial and circumferential relative movement of the plenum and the support case.

12. The gas turbine engine as defined in claim 9 wherein the second transfer tubes comprise at least three second transfer tubes, axially aligning with the high and low pressure turbine shrouds and the stator vane ring assembly, respectively.

13. The gas turbine engine as defined in claim 9 comprising a low pressure spool and a high pressure spool, wherein the first and second turbine stage assemblies are respective first and second stages of a high pressure turbine assembly of the high pressure spool.

14. A gas turbine engine as defined in claim 9 comprising low, intermediate and high pressure spools, wherein the first and second turbine stage assemblies are a high pressure turbine assembly of the high pressure spool and an intermediate pressure turbine assembly of the intermediate pressure spool, respectively.

15. The gas turbine engine as defined in claim 9 wherein the control valve is a three-way valve which is also connected to an outer plenum of a low pressure turbine assembly positioned downstream of the first and second turbine stage assemblies.

* * * * *